United States Patent
Schmitjes et al.

(10) Patent No.: US 8,802,602 B2
(45) Date of Patent: Aug. 12, 2014

(54) MAINTENANCE-FREE PLAIN BEARING

(75) Inventors: Olaf Schmitjes, Essen (DE); Joerg Heldmann, Aachen (DE)

(73) Assignee: Saint-Gobain Performance Plastics Pampus GmbH, Willich (DE)

( * ) Notice: Subject to any disclaimer, the term of this patent is extended or adjusted under 35 U.S.C. 154(b) by 1300 days.

(21) Appl. No.: 12/582,335

(22) Filed: Oct. 20, 2009

(65) Prior Publication Data

US 2010/0098360 A1 Apr. 22, 2010

Related U.S. Application Data

(63) Continuation-in-part of application No. PCT/EP2007/060736, filed on Oct. 10, 2007.

(30) Foreign Application Priority Data

Apr. 20, 2007 (DE) .................. 10 2007 019 200

(51) Int. Cl.
*F16C 33/00* (2006.01)

(52) U.S. Cl.
USPC .......................................... 508/100

(58) Field of Classification Search
USPC .......................................... 508/100
See application file for complete search history.

(56) References Cited

U.S. PATENT DOCUMENTS

| | | | |
|---|---|---|---|
| 4,624,887 A | 11/1986 | Bickle et al. | |
| 5,573,846 A * | 11/1996 | Harig et al. | 428/323 |
| 6,726,994 B1 * | 4/2004 | Araki et al. | 428/411.1 |
| 6,770,378 B1 | 8/2004 | Lehmann | |
| 7,025,853 B2 | 4/2006 | Kesselmayer | |
| 7,241,817 B2 | 7/2007 | Bonnet et al. | |
| 7,942,581 B2 | 5/2011 | Leonardelli | |
| 2007/0092173 A1 | 4/2007 | Tsuji et al. | |
| 2008/0102307 A1 | 5/2008 | Zidar | |
| 2008/0159671 A1 | 7/2008 | Leonardelli | |
| 2012/0275731 A1 | 11/2012 | Ziegler et al. | |

FOREIGN PATENT DOCUMENTS

| | | |
|---|---|---|
| CA | 2152279 A1 | 7/1994 |
| DE | 19823609 A1 | 12/1999 |
| DE | 102005046571 A1 | 4/2007 |
| EP | 0394518 * | 10/1990 |
| EP | 0394518 A1 | 10/1990 |

(Continued)

OTHER PUBLICATIONS

U.S. Appl. No. 13/458,882, filed Apr. 27, 2012 Inventors: Julia Ziegler et al., 28 pgs.

(Continued)

*Primary Examiner* — Taiwo Oladapo
(74) *Attorney, Agent, or Firm* — Chi Suk Kim; Abel Law Group, LLP

(57) ABSTRACT

A maintenance-free plain bearing includes a metal support, an intermediate layer applied directly thereto and a sliding layer applied to the intermediate layer. The intermediate layer includes at least one functionalized thermoplastic polymer having functional groups of the formula

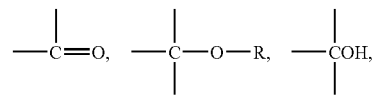

—COOH and/or —COOR, where the radicals R are cyclic or linear organic radicals having from 1 to 20 carbon atoms.

21 Claims, 1 Drawing Sheet

(56) References Cited

FOREIGN PATENT DOCUMENTS

| | | |
|---|---|---|
| EP | 0650987 A1 | 5/1995 |
| EP | 0848031 B1 | 6/2003 |
| JP | 61-211525 A | 9/1986 |
| JP | 07-018035 A | 1/1995 |
| JP | 07-173446 A | 7/1995 |
| JP | 09-117095 A | 5/1997 |
| JP | 10-331855 A | 12/1998 |
| JP | 2000-192961 A | 7/2000 |
| JP | 2002-194380 A | 7/2002 |
| JP | 2004-019758 A | 1/2004 |
| JP | 2004035890 A | 2/2004 |
| JP | 2004358904 A | 12/2004 |
| JP | 2005015793 A | 1/2005 |
| JP | 04-505335 B2 | 4/2006 |
| JP | 2006-111885 A | 4/2006 |
| WO | 9415999 A1 | 7/1994 |
| WO | 00/29210 | 5/2000 |
| WO | 02/096644 A | 12/2002 |
| WO | 2004/056751 A1 | 7/2004 |
| WO | 2010/038137 A1 | 4/2010 |

OTHER PUBLICATIONS

International Search Report from International Application No. PCT/US2012/035621 (1 pg.).

International Search Report from International Application No. PCT/EP2007/060736 (1 pg.).

* cited by examiner

■ plain bearing according to the invention with modified ETFE

◆ plain bearing according to the prior art using standard ETFE

MAINTENANCE-FREE PLAIN BEARING

CROSS-REFERENCE TO RELATED APPLICATION(S)

The present application is a continuation-in-part and claims priority from PCT Application No. PCT/EP2007/060736, filed Oct. 10, 2007, entitled "Maintenance-Free Plain Bearing," naming inventors Olaf Schmitjes and Joerg Heldmann which application is incorporated by reference herein in its entirety. The present application claims priority from DE Application No. 102007019200.4, filed Apr. 20, 2007 entitled "Maintenance-Free Plain Bearing," naming inventors Olaf Schmitjes and Joerg Heldmann which application is incorporated by reference herein in its entirety.

FIELD OF THE DISCLOSURE

The disclosure relates to a maintenance-free plain bearing comprising a metal support, an intermediate layer applied directly thereto and a sliding layer applied to the intermediate layer.

BACKGROUND

Maintenance-free plain bearings which comprise a layer structure having a metallic support material, an intermediate layer and a sliding layer applied thereto have been known for a long time in a variety of forms from the prior art and are used in a wide variety of technical fields, for example in the field of automotive engineering.

EP 0 394 518 A1 describes a multilayer plain bearing material in which the metallic support material preferably consists of cold-rolled steel on which a layer of a copolymer of perfluoro(alkyl vinyl ether) and tetrafluoroethylene has been applied as intermediate layer. A sliding layer composed of a PTFE compound material is in turn applied to the intermediate layer. In this plain bearing material, the intermediate layer has the function of establishing firm adhesion of the sliding layer to the support material. In order firstly to ensure adhesion of the intermediate layer to the support material, the surface of the metallic support material in this known plain bearing material has to be pretreated in a suitable manner by wet chemical means. The best results appear to be achieved by chromating of the surface of the metallic support. However, this process is problematical for a variety of reasons, including environmental issues and others. As such, there is a continued need for improved maintenance free plain bearings.

SUMMARY

In an embodiment, a maintenance-free plain bearing can include a metal support, an intermediate layer applied directly thereto, and a sliding layer applied to the intermediate layer. The intermediate layer can include at least one functionalized thermoplastic polymer having functional groups of the formula

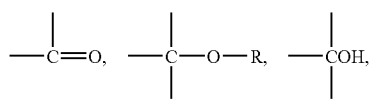

—COOH and/or —COOR, where the radicals R are cyclic or linear organic radicals having from 1 to 20 carbon atoms.

In another embodiment, a process for producing a maintenance-free plain bearing includes joining the intermediate layer and the sliding layer over their area to the metal support under pressure and with introduction of heat. The intermediate layer includes at least one functionalized thermoplastic polymer having functional groups of the formula

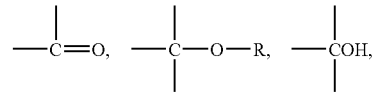

—COOH and/or —COOR, where the radicals R are cyclic or linear organic radicals having from 1 to 20 carbon atoms.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

Figure 1:
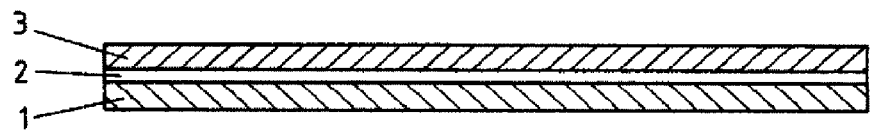
FIG. 1 shows an exemplary plain bearing in schematic sectional view.

In an embodiment, a maintenance-free plain bearing can include a metal support, an intermediate layer applied directly thereto, and a sliding layer applied to the intermediate layer, in which excellent adhesion of the sliding layer to the support material is ensured over the long term and whose production makes do without use of ecologically problematical processes for surface pretreatment.

In an embodiment, a maintenance-free plain bearing can include an intermediate layer comprising at least one functionalized thermoplastic polymer with incorporation of functional groups of the formula

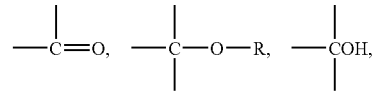

—COOH and/or —COOR, where the radicals R are cyclic or linear organic radicals having from 1 to 20 carbon atoms. If the organic radical R contains, for example, only one carbon atom, the functional group

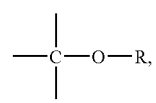

preferably has the following formula

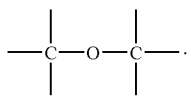

The functional groups can be incorporated into the thermoplastic polymer (A) by addition of at least one modifying agent (B). Suitable modifying agents are, for example, maleic acid and derivatives thereof, in particular the anhydride thereof, itaconic acid and derivatives thereof, in particular the anhydride thereof, and/or citraconic acid and derivatives thereof, in particular the anhydride thereof. Here, the ratio of the polymer (A) to the modifying agent (B) can be from 99.9 mol % of (A): 0.1 mol % of (B) to 80 mol % of (A): 20 mol % of (B). The melt volume flow rate (MVR at 50° C.> as melting point and under a load of 7 kg) can be on the order of from 0.1 to 1000 mm$^3$/sec. The MVR is an index of the melt flow of the polymer and can thus be used as a rough estimate of the molecular weight. Ideally, the MVR is in the order of 5 to 500 mm$^3$/sec, particularly preferably in the range from 10 to 200 mm$^3$/sec.

In an embodiment, the plain bearing can be characterized by excellent adhesion of the sliding layer to the support material brought about by the intermediate layer including a functionalized thermoplastic polymer having functional groups of the above-mentioned type. Owing to the excellent adhesion to even an unpretreated surface of the metal support, in particular to cold-rolled steel, cold-rolled and subsequently electrolytically zinc-plated steel, aluminum, or stainless steel, ecologically problematical and disposal-intensive wet chemical pretreatment processes, in particular chromating, can be dispensed with. Physical processes for surface pretreatment (e.g. plasma pretreatment by corona discharge) as are described, for example, in EP 0 848 031 B1 in which a functionalized thermoplastic fluoropolymer is likewise described as constituent of a laminate are no longer necessary, as studies carried out by the applicant have shown. The process for producing the plain bearing can therefore be carried out at significantly lower costs compared to the prior art.

In an embodiment, the at least one functionalized thermoplastic polymer of the intermediate layer can be a functionalized thermoplastic fluoropolymer, in particular an ethylene-tetrafluoroethylene copolymer (ETFE), perfluoroalkoxyethylene (PFA) or tetrafluoroethylene-perfluoro(methyl vinyl ether) copolymer (MFA), with an ethylene-tetrafluoroethylene copolymer (ETFE) being particularly preferred.

The intermediate layer can comprise not only the at least one functionalized thermoplastic polymer but also a copolymer of perfluoro(alkyl vinyl ether) of the formula: $CF_2=CF-O-R_1$, where $R_1$ is a perfluoroethyl, perfluoro-n-propyl or perfluoro-n-butyl radical, and tetrafluoroethylene.

The thickness of the intermediate layer can correspond essentially to the roughness of the metal support, defined as the distance $R_{max}$ between the maximum profile peak height and the maximum profile valley depth of the roughness profile of the surface of the metal support. In this way, it can be ensured that a sufficiently thick adhesive layer is applied to the metal support so that a full-area adhesive bond between sliding layer and metal support is ensured. The adhesive layer should also not be made too thick. In this case, there would be a risk that, on joining the layers, parts of the adhesive layer could be pressed out from the adhesive bond or cohesive rupture could occur within parts of the adhesive layer projecting above the roughness profile of the metal support surface when the plain bearing is subjected to shear stress.

In another embodiment, the intermediate layer can comprise two layers of the functionalized thermoplastic polymer having functional groups of the formula

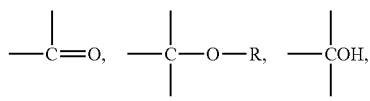

—COOH and/or —COOR. A metallic intermediate layer can be embedded between the two layers. Improved calibratability of the material can be achieved in this way. The metallic intermediate layer can here be configured as expanded metal. The metallic intermediate layer can comprise stainless steel, aluminum, or bronze.

To improve the mechanical and general physical properties of the plain bearing, the intermediate layer can contain fillers for increasing and/or improving the thermal conductivity and/or the wear properties. As fillers, preference is given to using fibers, inorganic materials, thermoplastic materials, or mineral materials, or mixtures thereof. Examples of fibers can include glass fibers, carbon fibers, and aramids. Examples of inorganic materials can include ceramic materials, carbon, glass, graphite, aluminum oxide, molybdenum sulfide, bronze, and silicon carbide. The inorganic materials can be in the form of woven fabrics, powders, spheres or fibers. Examples of thermoplastic materials can include polyimide (PI), polyamidimide (PAI), polyphenylene sulfide (PPS), polyphenylene sulfone (PPSO2), liquid crystal polymers (LCP), polyether ether ketones (PEEK), and aromatic polyesters (Ekonol). Example of mineral materials can include wollastonite and barium sulfate. The proportion of filler in the intermediate layer can be 1-40% by volume, in particular 5-30% by volume. The thickness of the intermediate layer can be in the range from 0.01 to 0.1 mm, in particular from 0.01 to 0.5 mm.

In an embodiment, the metal support used in the plain bearing can have a surface of a varying nature. Owing to the excellent adhesion properties of the intermediate layer comprising the functionalized thermoplastic polymer, the metal support can have either a smooth surface or a roughened or structured surface (for example as achieved by brushing, sandblasting, embossing of a structure). Regardless of the surface roughness, the surface can also be a surface-upgraded surface, such as an electrolytically zinc-plated surface.

As regards the material used, the metal support can consist of steel, in particular cold-rolled steel or matt zinc-plated steel, stainless steel, aluminum or alloys thereof. In a particular embodiment, the cold-rolled steel can be material number 1.0338 or 1.0347. In another particular embodiment, the stainless steel can be material No. 1.4512 or 1.4720.

The sliding layer applied to the intermediate layer can comprise a fluoropolymer, in particular polytetrafluoroethylene, polyamide, polyether ether ketone (PEEK) or a mixture thereof. In a particular embodiment, the sliding layer can include a PTFE compound layer. Here, the sliding layer can be configured as a perforated plastic film for increasing the conductivity.

In an embodiment, the maintenance-free plain bearing has excellent sliding properties and a long life when the thickness of the sliding layer is 0.01-1.5 mm, in particular 0.1-0.35 mm. The sliding layer applied to the intermediate layer can in turn also contain fillers for increasing and/or improving the thermal conductivity and/or the wear properties. The fillers can include fibers, inorganic materials, thermoplastic materials, or mineral materials, or mixtures thereof. Examples of fibers can include glass fibers, carbon fibers, and aramids. Examples of inorganic materials can include ceramic materials, carbon, glass, graphite, aluminum oxide, molybdenum sulfide, bronze, and silicon carbide. The inorganic materials can be in the form of woven fabrics, powders, spheres, or fibers. Examples of thermoplastic materials can include polyimide (PI), polyamidimide (PAI), polyphenylene sulfide (PPS), polyphenylene sulfone (PPSO2), liquid crystal polymers (LCP), polyether ether ketones (PEEK), and aromatic polyesters (Ekonol). Examples of mineral materials can include wollastonite and barium sulfate. The proportion of filler in the sliding layer can be 1-40% by volume, in particular 5-30% by volume.

In an embodiment a process for producing a maintenance-free plain bearing can include joining the intermediate layer and the sliding layer over their area to the support under pressure and with introduction of heat.

In this process, both the metal support and also the intermediate layer and the sliding layer are in each case rolled off a roll as continuous material and joined to one another under pressure and at elevated temperature in a laminating roller apparatus. To achieve further-improved adhesion of the intermediate layer to the metal support together with improved corrosion properties of the metal support, an embodiment of the process provides for the surface of the metal support to be roughed and/or surface-upgraded (e.g. by electrolytic zinc-plating) before application of the intermediate layer. Furthermore, the surface of the metal support can be increased by mechanical structuring, for example by brushing, sandblasting, embossing of a structure, which owing to the possibility of intermeshing has a positive effect on the resulting bonding forces.

The structure of an exemplary maintenance-free plain bearing is shown in FIG. 1. Here, the metal support is denoted by 1, while 2 denotes the intermediate layer and 3 denotes the sliding layer applied thereto.

In an embodiment, the intermediate layer 2 comprises at least one functionalized thermoplastic polymer having functional groups of the formula

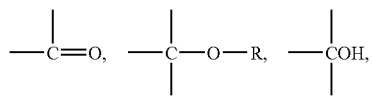

—COOH and/or —COOR, where the radicals R are cyclic or linear organic radicals having from 1 to 20 carbon atoms. The functional groups can be incorporated into the thermoplastic polymer (A) by addition of at least one modifying agent (B). Suitable modifying agents are, for example, maleic acid and derivatives thereof, in particular the anhydride thereof, itaconic acid and derivatives thereof, in particular the anhydride thereof, and/or citraconic acid and derivatives thereof, in particular the anhydride thereof. Here, the ratio of the polymer (A) to the modifying agent (B) can be from 99.9 mol % of (A): 0.1 mol % of (B) to 80 mol % of (A): 20 mol % of (B).

The sliding layer 3 applied to the intermediate layer 2 can be a PTFE compound tape, in particular as a surface-pretreated, preferably etched, PTFE compound tape. The PTFE compound layer 3 used can contain various fillers to improve the mechanical properties, e.g. fibers, inorganic materials, thermoplastic materials, or mineral materials, or mixtures thereof. Examples of fibers can include glass fibers, carbon fibers, and aramids. Examples of inorganic materials can include ceramic materials, carbon, glass, graphite, aluminum oxide, molybdenum sulfide, bronze, and silicon carbide. The inorganic materials can be in the form of woven fabrics, powders, spheres, or fibers. Examples of thermoplastic materials can include polyimide (PI), polyamidimide (PAI), polyphenylene sulfide (PPS), polyphenylene sulfone (PPSO2), liquid crystal polymers (LCP), polyether ether ketones (PEEK), and aromatic polyesters (Ekonol). Examples of mineral materials can include wollastonite and barium sulfate.

In an embodiment, the improved adhesive strength can be determined by means of a 180° peel test using sandwich laminates.

EXAMPLES

Specimens having a five-layer structure in which the central layer is formed by the metallic support 1, an intermediate layer 2 has been applied to each side of the metallic support 1, and an outer sliding layer 3 has been applied to each intermediate layer 2 are produced. Specifically, a functionalized ETFE is selected as material for the intermediate layer 2, cold-rolled steel of the grade 1.0338 is selected as metallic support 1 and a PTFE compound tape having a filler content of 25% is selected as sliding layer 3.

After production of the sandwich, the specimens is cut into strips having a width of 25 mm and subsequently subjected to a 180° peel test in accordance with DIN 1895 to determine tensile strengths.

Figure 2:
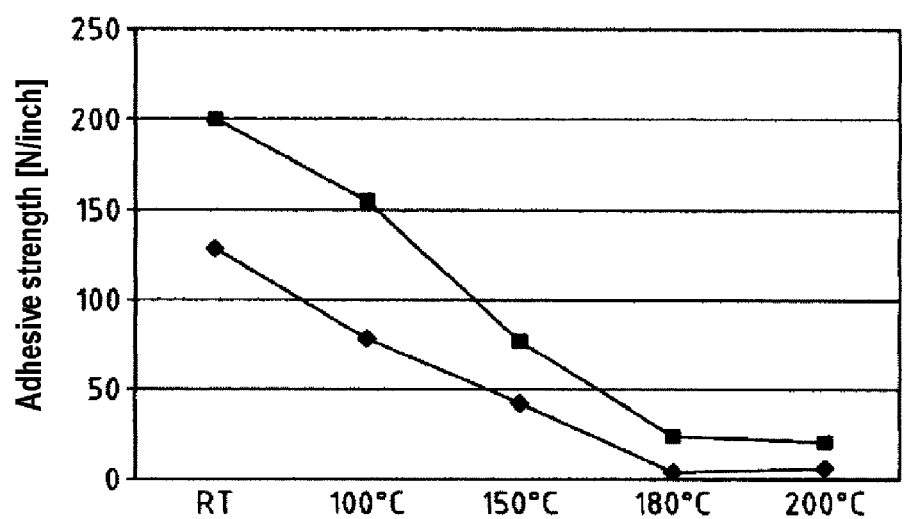
FIG. 2 shows a graph of experimental results of adhesive strength tests in accordance with DIN 1895 on plain bearings according to an embodiment.

As the experimental results presented in FIG. 2 show, significant improvements in the adhesive strength compared to standard ETFE can be achieved, in particular at room temperature, when using a functionalized ETFE, and this improvement is still present at high temperatures. As further studies have shown, increases in the adhesive strength up to about 800% can be achieved, depending on the material composition, by functionalization of the fluoropolymer layer.

What is claimed is:

1. A maintenance-free plain bearing comprising:
   a metal support;
   an intermediate layer applied directly thereto; and
   a sliding layer applied to the intermediate layer,
   wherein the intermediate layer comprises at least one functionalized thermoplastic polymer having functional groups, where the functional groups are incorporated into the thermoplastic polymer by addition of at least one modifying agent, wherein the modifying agent includes maleic acid, itaconic acid, citraconic acid, derivatives thereof, anhydride of maleic acid, anhydride of itaconic acid, anhydride of citraconic acid, or any combinations thereof.

2. The plain bearing of claim 1, wherein the at least one functionalized thermoplastic polymer of the intermediate layer is a functionalized thermoplastic fluoropolymer.

3. The plain bearing of claim 2, wherein the thermoplastic fluoropolymer includes an ethylene-tetrafluoroethylene copolymer (ETFE), perfluoroalkoxyethylene (PFA), or a tetrafluoroethylene-perfluoro (methyl vinyl ether) copolymer (MFA).

4. The plain bearing of claim 1, wherein the intermediate layer further comprises a copolymer of perfluoro(alkyl vinyl ether) of the formula:

where $R_1$ is a perfluoroethyl, perfluoro-n-propyl or perfluoro-n-butyl radical, and tetrafluoroethylene.

5. The plain bearing of claim 1, wherein the intermediate layer comprises two layers of the functionalized thermoplastic where a metallic intermediate layer is embedded between the two layers.

6. The plain bearing of claim 1, wherein the intermediate layer contains fillers for increasing or improving the thermal conductivity or the wear properties.

7. The plain bearing of claim 6, wherein the intermediate layer contains fibers, inorganic materials, thermoplastic materials, or mineral materials, or mixtures thereof as fillers.

8. The plain bearing of claim 6, wherein the proportion of filler is from 1 to 40% by volume.

9. The plain bearing of claim 1, wherein the intermediate layer has a thickness of from 0.01 to 0.1 mm.

10. The plain bearing of claim 1, wherein the metal support has a smooth surface.

11. The plain bearing of claim 1, wherein the metal support has a roughened surface.

12. The plain bearing of claim 1, wherein the metal support has a surface-upgraded surface.

13. The plain bearing of claim 12, wherein the surface-upgraded surface includes a electrolytically zinc-plated surface.

14. The plain bearing of claim 1, wherein the metal support comprises steel, stainless steel, or aluminum or alloys thereof.

15. The plain bearing of claim 1, wherein the sliding layer applied to the intermediate layer comprises polytetrafluoroethylene, polyamide, polyether ether ketone, or a mixture thereof.

16. The plain bearing of claim 1, wherein the sliding layer is configured as a perforated and/or air-permeable plastic film.

17. The plain bearing of claim 1, wherein the sliding layer has a thickness of from 0.01 to 1.5 mm.

18. The plain bearing of claim 1, wherein the sliding layer contains fillers for increasing and/or improving the thermal conductivity and/or the wear properties.

19. A process for producing a maintenance-free plain bearing, comprising:
joining the intermediate layer and the sliding layer over their area to the metal support under pressure and with introduction of heat,
wherein the intermediate layer comprises at least one functionalized thermoplastic polymer having functional groups, where the functional groups are incorporated into the thermoplastic polymer by addition of at least one modifying agent, wherein the modifying agent includes maleic acid, itaconic acid, citraconic acid, derivatives thereof, or any combinations thereof.

20. The process of claim 19, further including roughening the surface of the metal support before application of the intermediate layer.

21. The process of claim 19, further including upgrading the surface of the metal support before application of the intermediate layer.

* * * * *